Nov. 21, 1967     W. C. HUTTON     3,353,563

INSULATED JOINT

Filed April 1, 1966

INVENTOR
WALTER C. HUTTON
BY
EDWARD D. O'BRIAN
ATTORNEY

United States Patent Office 3,353,563
Patented Nov. 21, 1967

3,353,563
INSULATED JOINT
Walter C. Hutton, 1567 Waldren Ave.,
Los Angeles, Calif. 90041
Filed Apr. 1, 1966, Ser. No. 539,371
1 Claim. (Cl. 138—39)

ABSTRACT OF THE DISCLOSURE

An electrically insulating pipe joint in which a first tube of uniform diameter is surrounded by an outwardly belled portion of a second tube, and in which electrically non-conductive spacers are located at the ends of the two tubes in order to position them with respect to one another, the spacers at the end of the tube of uniform diameter fitting against the interior of the belled portion of the second tube and having an inwardly curved interior surface providing a restricted zone which causes a localized increase in the velocity of fluid flowing through said joint, such velocity tending to prevent contaminants from depositing upon the interior surface of said spacer.

---

This invention is directed to an insulated joint, particularly an insulated joint between successive sections of a pipeline or tubeline.

Modern pipelines are subject to the flow of stray electrical currents. These currents are either directly impressed upon the pipeline by electric systems using the ground as a return, or systems using the ground as a parallel for the main return. Streetcar electrical systems, for example, in the past have produced large currents in adjacent buried pipelines. All modern electrical distribution systems use the ground as a parallel return, primarily as a safeguard, but the result is that a certain amount of current is impressed in all buried pipelines near such systems. There are also induced currents resulting from magnetic fields. These either come from adjacent electrical transmission systems or from natural earth effects. Furthermore, sometimes fluid flow through a pipeline creates static electricity which in turn causes currents. In other cases, different pipe alloys create a battery effect which causes current flow. In any event, it is desirable to minimize such currents in order to prevent electrodecomposition of the pipe alloy.

Accordingly, it is an object of this invention to provide an insulating joint which is capable of being used in pipelines of any desired size and which has the character of electrically insulating one portion of the pipeline from another so that electric currents cannot flow therethrough.

It is a further object of this invention to provide an electrical insulating joint for pipelines, which joint is economic, of long life and is easily manufactured so that once installed in a pipeline it requires no maintenance.

It is a further object of this invention to provide an electrical insulating joint for a pipe or tubeline, which joint causes the increase in velocity of fluid flow through the insulated section so as to cause the maintenance of the insulating characteristics.

It is a further object of this invention to provide an insulating joint for a pipe or tubeline which comprises a separation of two adjacent portions thereof, which separation is filled with a non-conductive material having a high strength and in which the non-conductive material extends so as to reduce the pipline diameter at the insulated portion of the joint so as to increase velocity and reduce pressure therein to maintain the insulated portion of high insulating value.

Other objects and advantages of this invention will become apparent from a study of the following portion of this specification, the claim and the drawings in which:

Figure 1:
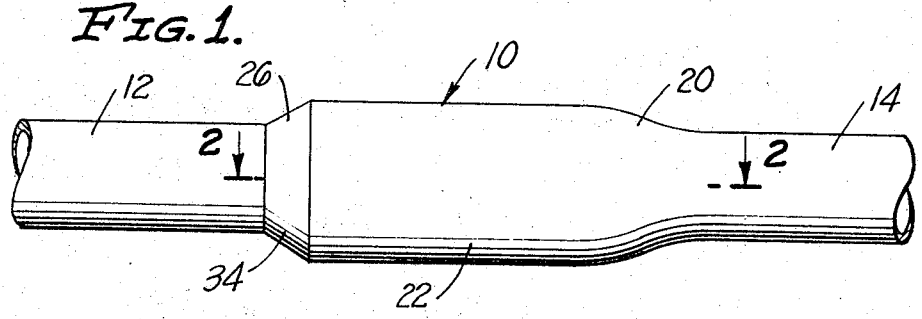
FIG. 1 is a side elevational view of a pipeline showing the insulating joint of this invention therein.
Figure 2:
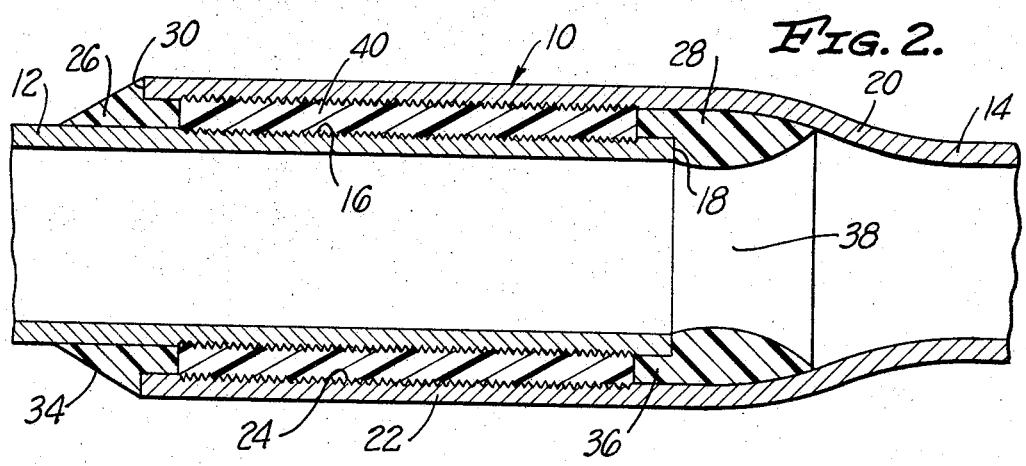
FIG. 2 is an enlarged section taken generally along line 2—2 of FIG. 1.

As an aid to understanding this invention it can be stated in essentially summary form that it is directed to an insulation joint which provides electrical insulation in a pipe or a tubeline. The joint comprises a section of the pipe of normal diameter having a roughened exterior surface. This serves as the internal portion of the overlapped section of the insulating joint. Another portion of the pipe has a belled end. This belled end is positioned over the exterior of the first portion, and the belled end is roughened on the interior. First and second annular rings are positioned in these portions so that they are telescoped into and spaced from each other. The ring interiorly of the belled section provides a zone of reduced pipeline cross section. This reduced cross section provides an increase in fluid flow velocity, with a consequent pressure decrease in that area. This increased velocity and reduced pressure sweeps contaminant particles from the insulation surface and reduces or removes condensation therefrom. This is a critical feature of the insulating joint. Both the first and second annular rings are made of high density, high dielectric strength materials. These rings space the first and second portions in the radial direction, and this space is filled with a suitable high physical strength and high dielectric strength material.

This invention will be understood in greater detail by reference to the following portion of this specification wherein the drawings are described. The insulating joint of this invention is generally indicated at 10. The insulating joint 10 is designed to be formed as a portion of a pipe or tubeline. The insulating joint 10 is useful in any reasonable diameter of such line, and can be designed to accommodate quite high pressure therein. In the illustrated embodiment, the insulating joint 10 shown is a pipeline of the general character used in long line transmission of liquid and gaseous petroleum products. However, it is clear that it is useful in any type of pipe or tubeline when such an insulating joint is desirable. The insulating joint 10 comprises tubes 12 and 14. These tubes are preferably of the same alloy and the same diameter as the remainder of the pipeline. They may be a portion of the pipeline, but preferably are arranged to be welded into the pipeline during normal pipeline field welding operations. By this means, the insulating joint 10 can be separately handled from the normal long pipeline lengths, and such insulating joints can be inserted wherever needed. Tube 12 is of normal pipeline diameter throughout its entire length and is roughened on its exterior surface at 16 adjacent its end 18. The roughening 16 extends to an appropriate length, determined by the pressure for which the insulating joint 10 is designed. For example, in normal petroleum pipeline service, a roughening 16 extending for three pipe diameters is usually satisfactory. The roughening 16 may be made in any convenient manner, depending upon the size of the pipeline. Again, in normal pipeline practice the roughening can be produced by grooving the exterior with a pipe threading tool, but preferably the groove extends in both right and lefthand directions.

Tube 14 is of normal pipeline diameter at the end which is to be welded into the pipeline, and is belled beginning at 20 so as to provide an enlarged interior diameter. By means of this bell, the roughened portion of tube 16 can be inserted and be positioned in spaced relationship to the enlarged diameter 22. The larger diameter 22 extends for an appropriate length to cover the roughening 16. It similarly has roughening 24 on the interior thereof. The roughening 24 corresponds in length and in axial position to the roughening 16. Furthermore, roughening 24 can be of the same form as the roughening 16.

First and second annular spacers 26 and 28 are positioned between the tubes 12 and 14 so as to maintain them in axial alignment and perform other functions. The spacers 26 and 28 are preferably made of high density, high dielectric strength material. Some types of polymer composition material are suitable for this service. For example, of the solid materials available and suitable, nylon and "Teflon" are suitable. Similarly polycarbonates are suitable. There are quite a few of such relatively rigid, relatively dense polymer composition materials of high dielectric strength. Other materials are also suitable, for example, phenolic impregnated linen. However, the solid polymer composition materials are considered superior for their very limited porosity and their high physical and dielectric strength.

First spacer 26 bears on the exterior surface of tube 12 and has a shoulder which engages interiorly on the end 30 of tube 14. Since this spacer 26 fits interiorly of the larger diameter of the bell portion 22 and exteriorly of tube 14, it spaces the tubes apart. The belling is sufficient to permit spacer 26 to enter therein, and also provides the space 32. The exterior of spacer 26 is formed as a cone 34 so as to provide a relatively long electrical path between the exterior of tube 14 and the exterior of tube 12.

Spacer 28 similarly has an annular shoulder 36 which fits between the exterior of tube 12 and the interior of the bell section 22 of tube 14. Thus, the spacing function is provided at the end 18 of tube 12. The exterior of spacer 28 is shaped to conform to the interior shape of tube 14 in that area. However, the interior shape of spacer 28 is critical. The interior surface of spacer 28 has a shoulder which adjoins end 18 so that the portion of the spacer exposed to fluid begins substantially at the interior diameter of tube 12. Furthermore, the interior surface of spacer 28 is a smooth annular curve which is first directed inwardly of the tube to provide constricted zone 38 and is directed outwardly in a smooth curve to join the interior surface of tube 14. The restricted zone 38 preferably has an internal diameter equal to about 90% of the internal diameter of tubes 12 and 14.

Figure 3:
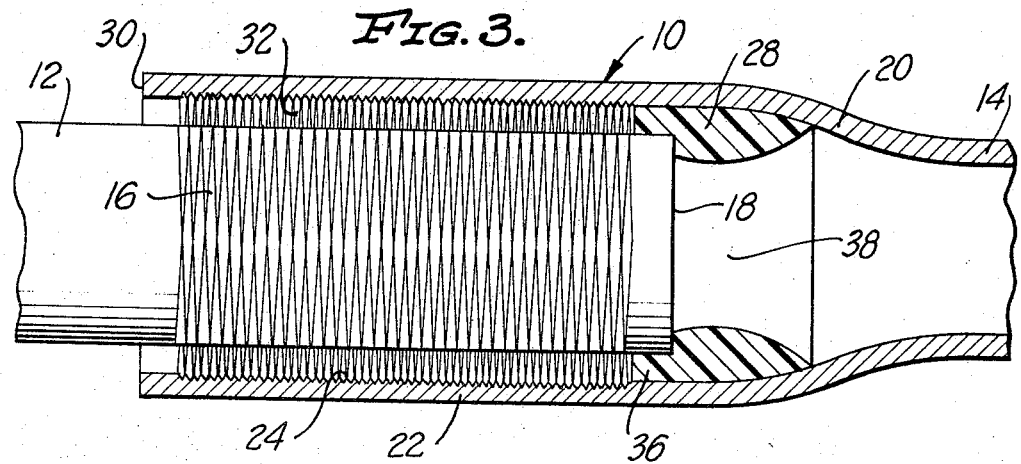
FIG. 3 is a view similar to FIG. 2 showing the insulating joint of this invention in partially assembled form.

The partially assembled condition is shown in FIG. 3. Spacer 28 is installed on the end of tube 12, and tube 12 is moved into the bell section 22 of tube 14 until spacer 28 is seated in the joint 20. The joint 10 is positioned upright with the end 30 upward and a suitable material is poured into the space 32. Preferably this material is epoxy resin 40, or any other suitable resin having high physical strength and high dielectric strength. The resin 40 engages in the roughened surfaces 16 and 24 so as to provide a longitudinal strength of the joint. After the resin 40 is poured, the spacer 26 is moved into place. Suitable fixtures can be provided for maintaining the proper spacing. The joint 10 is then treated in such a manner as to cause the resin 40 to harden. Thereupon, the joint 10 is ready for installation in a pipeline.

In pipeline use, the resin 40 takes in shear the longitudinal extension forces within the pipeline caused by the pressures of fluid within the line. Furthermore, the spacers 26 and 28 provide relatively long electric paths along the exterior thereof from one of the tubes to the other. The exterior surface 34 of spacer 26 is sufficiently long so that it presents no problem in normal environments. However, the interior of such pipelines may have electrically conductive condensation therein and may have contaminants therein which are conductive. The restricted zone 38 causes a local increase in the velocity of fluid flow through the pipeline. This increased velocity tends to prevent contaminants and condensation from depositing upon the interior surface within the zone 38. Furthermore, the increased velocity causes an appropriate pressure reduction in the restricted zone 38. This also aids in preventing condensation from depositing upon the surface of the restricted zone. Thus, the electrical insulation provided by the second spacer between the two tubes is maintained.

This invention having been described in its preferred embodiment, it is clear that it is susceptible to numerous modifications and embodiments within the scope of this invention and without the exercise of the inventive faculty. Accordingly, the scope of this invention is defined by the scope of the following claim.

I claim:

An electrically insulating pipe joint having
first and second electrically conducting tubes;
the first of said tubes having a uniform diameter;
the second of said tubes being belled so as to provide an enlarged uniform internal diameter;
said second tube being located so that the enlarged interial diameter thereof is located around said first of said tubes and the belled portion of said second of said tubes is located adjacent to the end of said first of said tubes;
first and second electrically non-conductive spacers holding said tubes separate and apart;
the first of said spacers being located between the exterior surface of the first of said tubes and the interior of the end of said second tubes;
the second of said spacers being located between the exterior of the end of the first of said tubes and the interior of the belled portion of the second of said tubes; and
electrically non-conductive material located in the area between said tubes bounded by said spacers;
the interior surface of said second of said spacers being curved inwardly towards the centers of said tubes so as to provide a restricted zone which causes a localized increase in the velocity of fluid flowing through said joint, such velocity tending to prevent contaminants from being deposited upon the interior surface of the second of said spacers.

References Cited

UNITED STATES PATENTS

| 522,896 | 7/1894 | Henley | 285—50 |
| 1,802,766 | 4/1931 | Kerr | 285—119 X |
| 2,075,427 | 3/1937 | Church | 285—374 X |
| 2,568,414 | 9/1951 | Russ | 285—55 |
| 2,741,498 | 4/1956 | Elliott | 285—374 X |
| 3,210,102 | 10/1965 | Joslin | 285—374 |

FOREIGN PATENTS

| 715,436 | 8/1965 | Canada. |
| 1,062,932 | 12/1953 | France. |
| 16,469 | 7/1906 | Great Britain. |
| 718,350 | 11/1954 | Great Britain. |
| 351,485 | 8/1937 | Italy. |

EDWARD C. ALLEN, *Primary Examiner.*

CARL W. TOMLIN, *Examiner.*

R. G. BERKLEY, *Assistant Examiner.*

UNITED STATES PATENT OFFICE

CERTIFICATE OF CORRECTION

Patent No. 3,353,563                          November 21, 1967

Walter C. Hutton

It is hereby certified that error appears in the above numbered patent requiring correction and that the said Letters Patent should read as corrected below.

Column 4, lines 27 and 28, for "interial" read -- internal --.

Signed and sealed this 14th day of January 1969.

(SEAL)
Attest:

Edward M. Fletcher, Jr.                       EDWARD J. BRENNER

Attesting Officer                              Commissioner of Patents